3,386,952
POLYESTER RESIN STABILIZED WITH PHENOLIC PHOSPHITES

Clyde E. Gleim, Bath, and Ronald B. Spacht, Kent, Ohio, assignors to The Goodyear Tire & Rubber Company, Akron, Ohio, a corporation of Ohio
No Drawing. Filed July 9, 1964, Ser. No. 381,552
11 Claims. (Cl. 260—45.95)

This invention relates to an improvement in condensation polyester resins and to a method for preparing condensation polyester having improved stability.

Highly polymeric polyesters are derived from glycols and dicarboxylic acids or ester-forming derivatives thereof by condensation reaction. In carrying out such reactions the reactants are treated under stringent conditions of elevated temperature and reduced pressure for considerable periods of time. The polymeric polyesters prepared develop a light yellow or brown color which is highly undesirable because such color is carried over into products made from the polyester resins. Development of any yellow or brown color is especially undesirable in fibers and films which constitute a major use for condensation polyester resins. In addition to the development of color, condensation polyesters degrade on exposure to heat and to conditions that favor hydrolysis of ester compounds.

It is an object of the present invention to produce polyester resins of improved stability. Another object is to produce polyester resins having improved stability when aged in air at elevated temperatures. Another object is to provide a method of producing polyester resins having a low degree of color and which have good thermal and hydrolytic stability. Other objects will appear as the description of the invention proceeds.

According to the invention highly polymeric condensation polyester resins having superior stability and improved color are produced by incorporating the resins a hindered phenolic phosphorus composition. The following examples illustrate the invention, the preparation of a particular representative phosphorus compound being set out in Example 1, and the stabilization of polyester resins being demonstrated in subsequent examples.

EXAMPLE 1

Three hundred and sixty-six grams (2.6 mols) of PCl₃ were placed in a dry, three-necked flask equipped with a mechanical stirrer, a reflux condenser and a stopper. To the flask were then added 220 grams (1.0 mol) of p-nonyl phenol and the resulting mixture was stirred at 65° C. Hydrogen chloride was evolved as the reaction proceeded. After the evolution of HCl stopped the condenser was replaced by a short distilling head and the excess PCl₃ was flashed off. The product was a colorless liquid, dichloro-p-nonylphenyl phosphite.

A solution of 68 grams (0.2 mol) of di(t-butyl)-bisphenol-A.

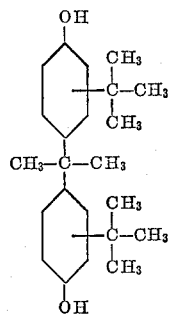

in 206 grams of benzene was placed in a three-necked flask fitted with a mechanical stirrer, distilling head and a gas bubble tube. 30.8 grams of the above dichloro-p-nonylphenyl phosphite were added with continuous stirring. The benzene was then removed by distillation and dry nitrogen was passed through the reaction mixture to aid the removal of HCl gas.

The reaction mixture was then heated slowly over a three hour period to a temperature of 200° C. and was maintained at a temperature of from 190° to 200° C. for about 40 minutes. The resulting product was a pale yellow viscous liquid.

The following examples illustrate the use of the materials in the stabilization of polyester resins.

EXAMPLE 2

Stabilization of polyester

Fifty grams of polyethylene terephthalate containing 0.054 part per hundred by weight of triphenyl phosphite, intrinsic viscosity 0.728 (measured in a 60/40 phenol/tetrachloroethane mixture at 30.0° C.) was vacuum dried at 135° C. for 16 hours at one millimeter of mercury pressure and then was melted under dry nitrogen in a glass tube reactor. Then 0.15 gram (0.3 part per hundred) of the hindered phenolic phosphite stabilizer from Example 1 was stirred into the melt. The stabilized polyethylene terephthalate was removed from the reactor by means of a glass rod and spatula and ground in a Wiley mill to pass through a 20 mesh screen. The polymer was redried under conditions described above. Five grams of the redried hindered phenolic phosphite stabilized polymer were placed in a small Petri dish and aged at atmospheric pressure at 200° C. in a non-air circulating electrically heated oven. Degradation was followed by measuring the drop in intrinsic viscosity with time. The effectiveness of the hindered phenolic phosphite stabilizer of Example 1 is shown in Table I by comparing aging results with a dried control sample of the same polymer containing only 0.054 part per hundred of triphenyl phosphite.

TABLE I.—STABILITY OF POLYETHYLENE TEREPHTHALATE AT 200° C.

| Aging Time at 200° C. Atmospheric Pressure in Air Atmosphere | Polyethylene Terephthalate with 0.3 parts per hundred of Hindered Phenolic Phosphite Stabilizer from Example 1 plus 0.054 of Triphenyl Phosphite | | Polyethylene Terephthalate with 0.054 parts per hundred by weight of Triphenyl Phosphite (Control) | |
|---|---|---|---|---|
| | Intrinsic Viscosity | Percent Broken Bonds | Intrinsic Viscosity | Percent Broken Bonds |
| Initial Resin | 0.653 | | 0.728 | |
| One Day | 0.614 | 0.04 | 0.277 | 0.95 |
| Two Days | 0.533 | 0.14 | 0.274 | 0.97 |
| Three Days | 0.497 | 0.20 | 0.303 | 0.81 |
| Four Days | 0.503 | 0.19 | 0.324 | 0.72 |

The above heat aging data of Table I shows that the hindered phenolic phosphite from Example 1 is an effective stabilizer for polyesters and that triphenyl phosphite, generally used as a color and thermal stabilizer, is relatively ineffective for stabilizing polyesters against degradation when heated at high temperatures in the presence of air.

The equation for calculating the percent broken bonds (BB) for polyethylene terephthalate is given below:

$$\text{Percent } BB = \frac{K[N]_0 - [N]_a}{[N]_0 \times [N]_a}$$

where $K$ = a variable dependent on the molecular weight-intrinsic viscosity relationships,
$[N]_0$ = intrinsic viscosity of the initial sample,
$[N]_a$ = intrinsic viscosity of the aged sample.

The intrinsic viscosity of each sample was determined in a 60/40 phenol-tetrachloroethane mixed solvent at 30.0° C.

EXAMPLE 3

Three polyethylene terephthalate samples containing no stabilizers, one part per hundred of tricresyl phosphate, and 0.5 part per hundred of the hindered phenolic phosphite stabilizer from Example 1, respectively, were heat aged as in Example 2. Results are shown in Table II.

TABLE II.—STABILIZATION OF POLYESTERS

| Aging Time at 200° C. Atmospheric Pressure in Air Atmosphere | Polyethylene Terephthalate with 0.5 part per hundred by wt. of Hindered Phenolic Phosphite Stabilizer from Example 1, percent Broken Bonds | Polyethylene Terephthalate No Stabilizers (Control), percent Broken Bonds | Polyethylene Terephthalate with 1 part per hundred by wt. of Tricresyl Phosphate, percent Broken Bonds |
|---|---|---|---|
| One Day | 0.004 | 0.71 | 0.42 |
| Two Days | 0.06 | 1.17 | 0.50 |
| Three Days | 0.14 | | |
| Four Days | 0.20 | | |

These results also show the effectiveness of the hindered phenolic phosphate stabilizer. Tricresyl phosphate has some stabilizing effect but is vastly inferior to the compound of this invention.

EXAMPLE 4

One part per hundred by weight of the hindered phenolic phosphite stabilizer of Example 1 was incorporated into the melt of a copolyester derived from tetramethylene glycol, terephthalic acid and sebacic acid in which terephthalic acid units comprise 70 mol percent of the total acid units in the copolyester and isophthalic acid units and sebacic acid units comprised 10 and 20 mol percent respectively. The resulting stabilized copolymer was cooled, ground to pass through a 20 mesh screen, dried at 135° C. for 16 hours at about one millimeter of mercury pressure, and then was heat aged at 150° C. in a regular electrically heated oven along with two additional samples of the same copolyester containing 0.054 part per hundred by weight of triphenyl phosphite and one part per hundred by weight of triphenyl phosphite. Heat aging results are shown in Table III.

TABLE III.—STABILIZATION OF THE TETRAMETHYLENE TEREPHTHALATE/ISOPHTHALATE/SEBACATE COPOLYESTER

| Aging Time at 150° C. Atmospheric Pressure in Air Atmosphere | Copolyester plus 1 part per hundred by wt. of Hindered Phenolic Phosphite of Example 1 and 0.054 part per hundred of Triphenyl Phosphite, percent Broken Bonds | Copolyester with 0.054 part per hundred by wt. of Triphenyl Phosphite, percent Broken Bonds | Copolyester plus 1 part per hundred by wt. of Triphenyl Phosphite, percent Broken Bonds |
|---|---|---|---|
| One Day | 0.013 | 0.80 | 0.135 |
| Two Days | 0.005 | 0.83 | 0.146 |
| Three Days | 0.005 | | 0.144 |
| Four Days | 0.019 | | 0.162 |

The data of Table II shows the superiority of the hindered phenolic-phosphite stabilizer of Example I for stabilizing copolyesters.

The example illustrates stabilization of polyethylene terephthalate resin and copolyester resin by adding the stabilizing agent to molten high molecular weight polymer. The stabilizing agents of the invention can also be incorporated in the resin by adding them to low molecular weight polyester having an intrinsic viscosity of 0.1 to 0.2 as measured in a 60/40 phenol-tetrachloroethane mixed solvent at 30.0° C. and condensing the low molecular weight polymer to form high molecular weight polymer or by adding them to the polyester-forming reactants such as the lower alkyl esters of the acids and the glycol and preparing the high molecular weight polymer from the reactants. Thus the stabilizing agents can be added to their original reactants, to the finished polyester resin or to the reactants at some intermediate stage in the preparation of the resins. The stabilizing agents are most effective when incorporated in the resin before it is fully polymerized.

The invention has been illustrated particularly with respect to stabilizing polyethylene terephthate and the 70/10/20 polytetramethylene terephthalate/isophthalate/sebacate copolyester resins. The stabilizers are also effective in stabilizing other condensation resins. Representative examples of such condensation polyester resins are resins derived from dicarboxylic acids or ester-forming derivatives thereof and glycols, for example, polyethylene terephthalate, polypropylene terephthalate, polytetramethylene terephthalate, poly 2,2-dimethyl-1,3-propylene terephthalate, polycyclohexanedimethanol terephthalate, polyethylene bibenzoate and copolyesters of terephthalic acids with an aromatic dicarboxylic acid such as ethylene terephthalate-ethylene isophthalate copolyesters and copolyesters of an aromatic dicarboxylic acid such as terephthalic acid with one or more aliphatic dicarboxylic acids. Dicarboxylic acids from which the resins can be derived are aliphatic dicarboxylic acids such as adipic acid, sebacic acid, and azelaic acid; aromatic dicarboxylic acids such as orthophthalic acid, isophthalic acid, terephthalic acid, 2,5-dichloroterephthalic acid, bibenzoic acid and the naphthalic acids. The resins can be made from various glycols including glycols such as the propylene glycols, the butylene glycols, pentamethylene glycol, hexamethylene glycol, decamethylene glycol, diethylene glycol, 1,4-cyclohexane dimethanol, and 2,2-bis-[4(beta hydroxyethoxy)phenyl] propane. Ethylene glycol is a preferred glycol because of its low cost and ready availability.

In the preparation of the polyester resins various catalysts can be used. Suitable catalysts for the ester interchange a reaction used to prepare the polyester resins are zinc acetate, manganese acetate, manganese octoate, calcium acetate and the alkali metal alcoholates. Catalysts suitable for the condensation reactions by which the high molecular weight polymers are prepared are soluble antimony compounds such as antimony trioxide, lead compounds such as lead acetate and litharge and titanium compounds such as titanium alcoholates and polymeric ethylene glycol titanate.

The amount of the stabilizer used can be varied over a wide range of concentrations. Generally the amount used will be from 0.01 to 2.0 percent by weight of the polyester resin used. The preferred amounts usable will be in the range of from 0.05 to 2.0 percent by weight of the polyester resin to obtain stability in the resin. While the stabilizer of the invention will usually be used as the sole stabilizing agent in the polyester resin, it can be used in conjunction with other stabilizing agents if desired.

The invention has been illustrated particularly with respect to the use of the compound having the formula

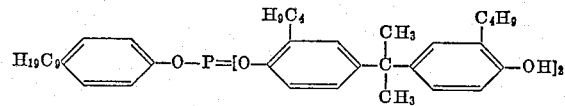

as a polyester stabilizer. Other hindered phenolic compounds can be used. Representative examples of such compounds are compounds of the general formula

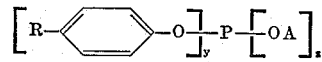

in which R is a hydrocarbon radical containing from 4 to 10 carbon atoms, P represents the phosphorus atom, and y and z are integers selected from 1 and 2 and the sum of y and z equals 3 and A is selected from the group consisting of (I)
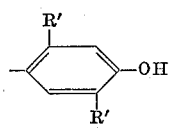

(II)
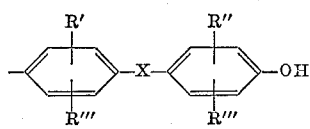

and (III)
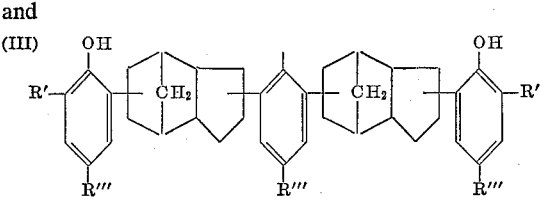

wherein R' and R'' are selected from the group consisting of the same and different tertiary alkyl radicals containing from 4 to 8 carbon atoms, R''' is selected from hydrogen and alkyl radicals containing from 1 to 10 carbon atoms and X is a saturated aliphatic divalent radical containing from 1 to 4 carbon atoms.

Illustrations of radicals represented by the symbols are, for example, where R represents hydrocarbon radicals containing 4 to 10 carbon atoms R can be radicals such as the various butyl, pentyl, hexyl, heptyl, octyl, nonyl and decyl radicals and benzyl and phenethyl radicals; where R' and R'' represent tertiary alkyl radicals they may be radicals such as tertiary butyl, tertiary amyl, tertiary hexyl, tertiary heptyl and tertiary octyl; where X represents saturated aliphatic divalent radicals containing from 1 to 4 carbon atoms the radicals can be methylene, ethylene, the isopropylene and the butylene radicals; and where R''' represents alkyl radicals containing from 1 to 10 carbon atoms the radicals can be methyl, ethyl, n-propyl, isopropyl, the various isomeric butyl, pentyl, hexyl, heptyl, octyl, nonyl and decyl radicals.

Representative compounds illustrating the above formula would have substituents as follows:

| R | A | R' | R'' | R''' | X | Y | Z | Y | Z |
|---|---|---|---|---|---|---|---|---|---|
| Butyl | I | t-Butyl | | | | 1 | 2 | 2 | 1 |
| Do | II | do | t-Butyl | | Methylene | 1 | 2 | 2 | 1 |
| Amyl | II | do | do | | do | 1 | 2 | 2 | 1 |
| Hexyl | II | do | do | | do | 1 | 2 | 2 | 1 |
| Octyl | II | t-Amyl | t-Amyl | | Ethylene | 1 | 2 | 2 | 1 |
| Do | II | do | do | | Propylene | 1 | 2 | 2 | 1 |
| Do | II | do | do | | Isopropylene | 1 | 2 | 2 | 1 |
| Nonyl | II | t-Hexyl | t-Hexyl | | Butylidene | 1 | 2 | 2 | 1 |
| Decyl | II | t-Octyl | t-Octyl | | Isobutylidene | 1 | 2 | 2 | 1 |
| Butyl | III | t-Butyl | | | Methyl | 1 | 2 | 2 | 1 |

The reactions by which the resins are prepared are in general carried out in accordance with the usual known techniques. Thus the resins are prepared from dicarboxylic acids and glycols or ester-forming derivatives thereof, generally by the ester interchange reaction of a lower alkyl ester of the acid with a glycol to form the glycol esters which are polymerized by condensation, with elimination of glycol to form high molecular weight resin. The reactions are preferably carried out in the absence of oxygen, generally in an atmosphere of inert gas such as nitrogen or the like, in order to lessen darkening and to make it possible to prepare a high molecular weight lightly colored or colorless product. The condensation reaction is carried out under reduced pressure, generally below 10 millimeters of mercury pressure, and usually at or below one millimeter of mercury pressure at a temperature in the range of from about 260 to 290° C. to form high molecular weight polyester having an intrinsic viscosity of at least 0.3 and generally at least 0.4 measured in a 60/40 phenol-tetrachloroethane mixed solvent at 30.0° C.

Flexible copolyesters, based on mixtures of aromatic dicarboxylic acids and an aliphatic dicarboxylic acid and a glycol such as the polytetramethylene terephthalate/isophthalate/sebacate copolyester stabilized with hindered phenolic-phosphite antioxidant compounds are of particular interest for filament, film and coating applications where the materials will be subjected to high temperatures in the presence of air.

While certain representative embodiments and details have been shown for the purpose of illustrating the invention it will be apparent to those skilled in this art that various changes and modifications may be made therein without departing from the spirit or scope of the invention.

What we claim is:

1. The stabilized polyester composition comprising a highly polymeric linear condensation polyester resin derived from glycols and organic dicarboxylic acids and ester forming derivatives thereof containing a stabilizing amount of a hindered phenolic phosphorus compound of the formula

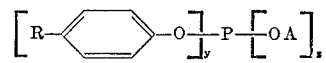

in which R is a hydrocarbon radical containing from 4 to 10 carbon atoms, P represents the phosphorus atom, and y and z are integers selected from 1 and 2 and the sum of y plus z equals 3 and A is selected from the group consisting of (I)
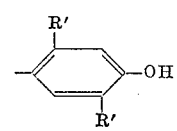

(II)
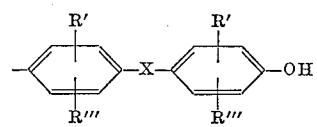

and (III)
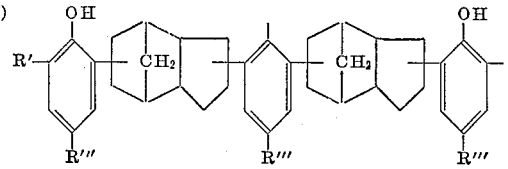

wherein R' and R'' are selected from the group consisting of the same and different tertiary alkyl radicals containing from 4 to 8 carbon atoms, R''' is selected from hydrogen and alkyl radicals containing from 1 to 10 carbon atoms and X is a saturated aliphatic divalent radical containing from 1 to 4 carbon atoms.

2. The stabilized polyester composition containing from 0.01 to 2.0 percent, based on the polyester resin of a compound of claim 1 in which A has the formula

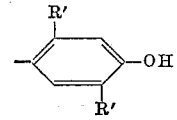

in which R' is selected from tertiary alkyl radicals containing from 4 to 8 carbon atoms.

3. The stabilized polyester composition of claim 1 containing from 0.01 to 2.0 percent, based on the polyester resin of a compound in which A has the formula

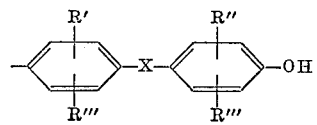

wherein R' and R" are selected from the group consisting of the same and different tertiary alkyl radicals containing 4 to 8 carbon atoms, R''' is selected from hydrogen and alkyl radicals containing 1 to 10 carbon atoms and X is a saturated aliphatic divalent radical containing from 1 to 4 carbon atoms.

4. The stabilized polyester composition of claim 1 containing from 0.01 to 2.0 percent, based on the polyester resin, of a compound in which A has the formula

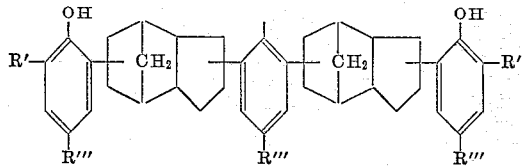

wherein R' is selected from tertiary alkyl radicals containing 4 to 8 carbon atoms and R''' is selected from hydrogen and alkyl radicals containing from 1 to 10 carbon atoms.

5. A composition according to claim 1 in which the polyester resin is poly(tetramethylene terephthalate/isophthalate).

6. A composition according to claim 1 in which the polyester resin is poly(methylene terephthalate/isophthalate).

7. A composition according to claim 1 in which the polyester resin is polyethylene terephthalate.

8. Polymeric ethylene terephthalate containing from 0.01 to 2.0 percent by weight of

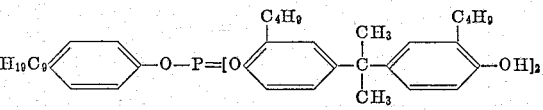

9. A composition according to claim 1 in which the resin is a copolyester prepared from a mixture of glycols with at least one aromatic dicarboxylic acid.

10. A composition according to claim 1 in which the resin is a copolyester prepared from an aliphatic glycol and a mixture of aromatic dicarboxylic acids with at least one aliphatic dicarboxylic acid.

11. A composition according to claim 1 in which the stabilizer used is

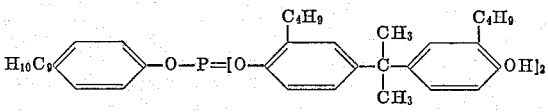

References Cited

UNITED STATES PATENTS

| | | | |
|---|---|---|---|
| 2,437,232 | 3/1948 | Rothrock | 260—45.7 |
| 2,650,213 | 8/1957 | Hofrichter | 260—75 |
| 3,112,286 | 11/1963 | Morris et al. | 260—45.95 |
| 3,305,520 | 2/1967 | Fritz et al. | 260—45.7 |

DONALD E. CZAJA, *Primary Examiner.*

H. E. TAYLOR, JR., *Assistant Examiner.*